(12) United States Patent
Neely, Jr. et al.

(10) Patent No.: US 7,000,950 B2
(45) Date of Patent: Feb. 21, 2006

(54) FILLER NECK FOR MOTOR VEHICLE FUEL TANK

(75) Inventors: Robert H. Neely, Jr., Fort Wayne, IN (US); David J. Martin, Fort Wayne, IN (US); Howard L. Pratt, Wolcottville, IN (US); Brad A. Hively, Fort Wayne, IN (US); Len A. Hindsley, Union City, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 105 days.

(21) Appl. No.: 10/800,226

(22) Filed: Mar. 12, 2004

(65) Prior Publication Data

US 2005/0211486 A1    Sep. 29, 2005

(51) Int. Cl.
 *B60K 15/077* (2006.01)
(52) U.S. Cl. ............... 280/834; 280/830; 220/86.1; 220/86.2; 141/331; 141/333; 138/37
(58) Field of Classification Search ................ 280/830, 280/833, 834, 835; 141/331, 333; 220/86.1, 220/86.2; 138/37, 177, 178
See application file for complete search history.

(56) References Cited

U.S. PATENT DOCUMENTS

| 4,676,517 | A | * | 6/1987 | Tamura ...................... 280/834 |
| 5,253,773 | A | * | 10/1993 | Choma et al. ............. 220/86.2 |
| 5,538,039 | A | * | 7/1996 | Harde et al. ................ 137/592 |
| 6,286,559 | B1 | * | 9/2001 | Palvolgyi ..................... 138/177 |
| 6,367,520 | B1 |   | 4/2002 | Palvolgyi et al. |
| 6,497,335 | B1 |   | 12/2002 | Löw et al. |

* cited by examiner

*Primary Examiner*—Christopher P. Ellis
*Assistant Examiner*—John Walters
(74) *Attorney, Agent, or Firm*—Jeffrey P. Calfa; Dennis Kelly Sullivan; Susan L. Lukasik

(57) ABSTRACT

A filler neck for a fuel tank used on busses achieves higher filling rates by varying the geometry and cross sectional size of the filler neck depending on local slope of the neck and available space to fit the neck, particularly between a bus chassis frame rail and the bus body floor.

6 Claims, 6 Drawing Sheets

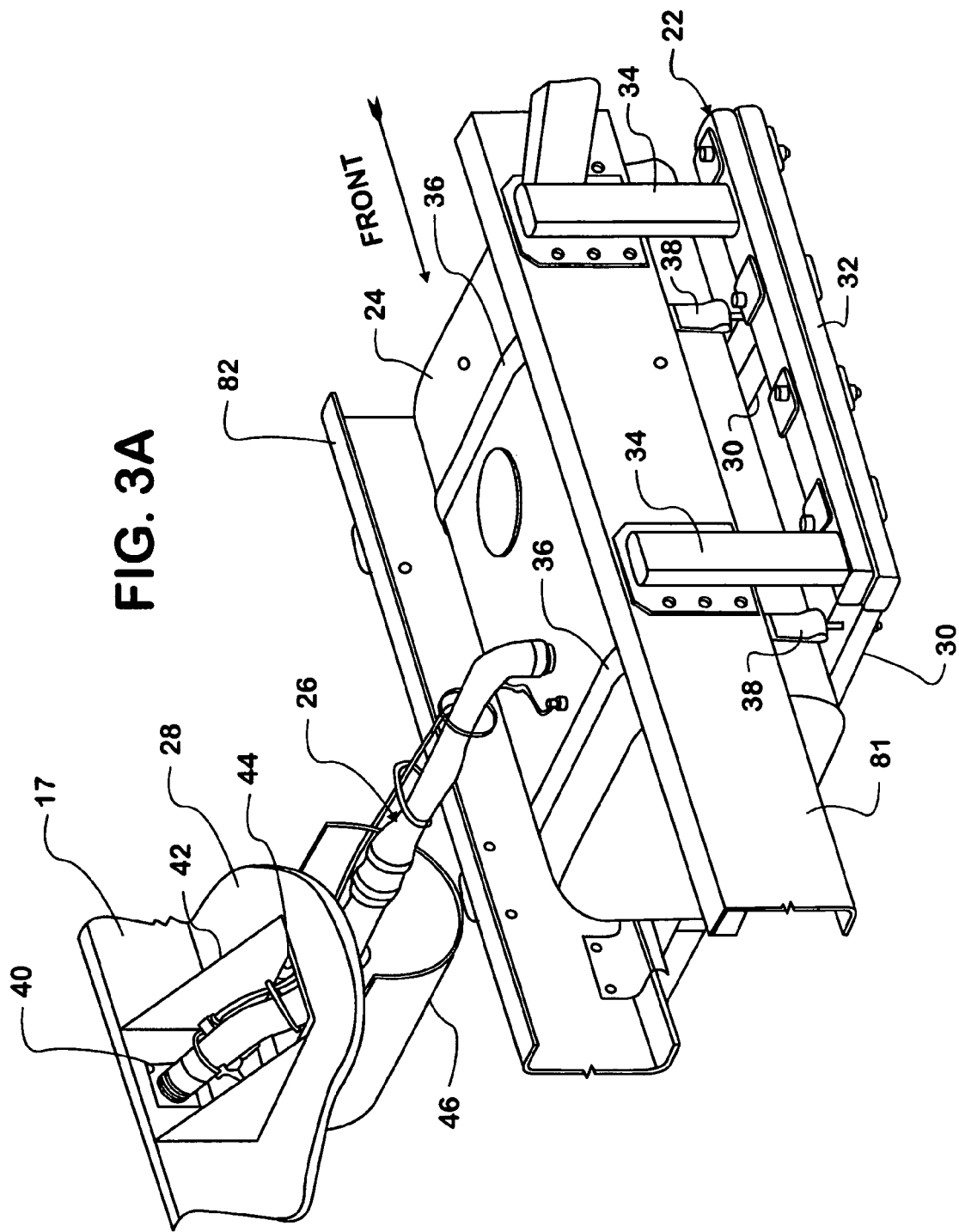

FILLER NECK FOR MOTOR VEHICLE FUEL TANK

BACKGROUND OF THE INVENTION

1. Technical Field

The invention relates to a fuel tank filler neck and more particularly to a filler neck for a between the rail (BTR) fuel tank which fits between a vehicle body floor and the vehicle chassis while admitting a high fuel flow rate on filling of the BTR fuel tank.

2. Description of the Problem

Filler necks connecting a fuel inlet on the side of a vehicle and a BTR fuel tank commonly found on busses have been unduly restrictive of fuel flow in certain applications. Fuel flow restriction has occurred due to the increasingly horizontal slope of the filler neck and the restricted diameter of the circular pipes sized to fit between the bus floor and the vehicle's frame rails. This has resulted in the back up of fuel as the fuel moves toward the fuel tank on filling.

SUMMARY OF THE INVENTION

According to the invention there is provided a fuel tank assembly for a motor vehicle. The vehicle is conventionally a school bus having a body, a body floor and a pair of parallel chassis frame rails which support the body. The fuel tank assembly comprises a fuel tank supported between the frame rails under the body floor. Fuel is added to the fuel tank through a filler neck having an inlet on a side of the motor vehicle. The filler neck connects the inlet to the fuel tank. The filler neck passes between the floor of the body and one of the frame rails. In order to assure a high rate of fuel flow the filler neck increases in cross sectional area as it comes closer to the fuel tank and the slope of the neck becomes more horizontal. The cross sectional profile of the neck varies from the inlet to the fuel tank between the vehicle floor body and the frame rails to allow a first increase in sectional area while still fitting between floor and frame rail. The filler neck has a circular cross sectional profile adjacent the inlet, flattens to an oblong cross sectional shape where the neck passes over one of the frame rails and returns to a circular cross sectional shape, of increased diameter, proximate to the fuel tank inlet.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3A and 3B are perspective view of a fuel tank assembly in accord with the present invention.

DETAILED DESCRIPTION OF THE INVENTION

Figure 1:
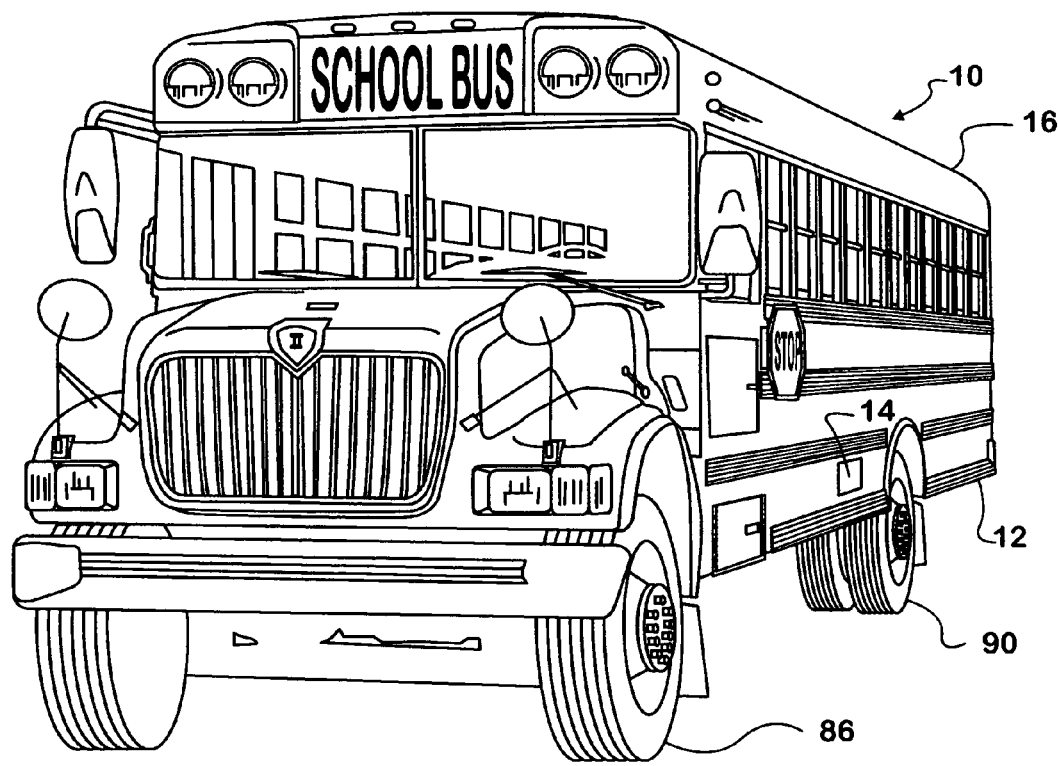
FIG. 1 is a perspective view of a bus.

Referring now to the figures and in particular to FIG. 1, a school bus 10, which incorporates a fuel system in accordance with the present invention, is illustrated. Along one side of the bus body 12 of school bus 10, here driver's side 12, a fuel inlet cover 14 is visible. Although fuel inlet cover 14 is illustrated as installed on the driver's side 12 of the vehicle, it is often located on the vehicle's opposite side. Fuel inlet cover 12 may be moved to allow access to a filler neck inlet behind the cover, by which fuel is added to a between the rails (BTR) fuel tank located under the bus body and between the front 86 and rear wheels 90.

Figure 2:
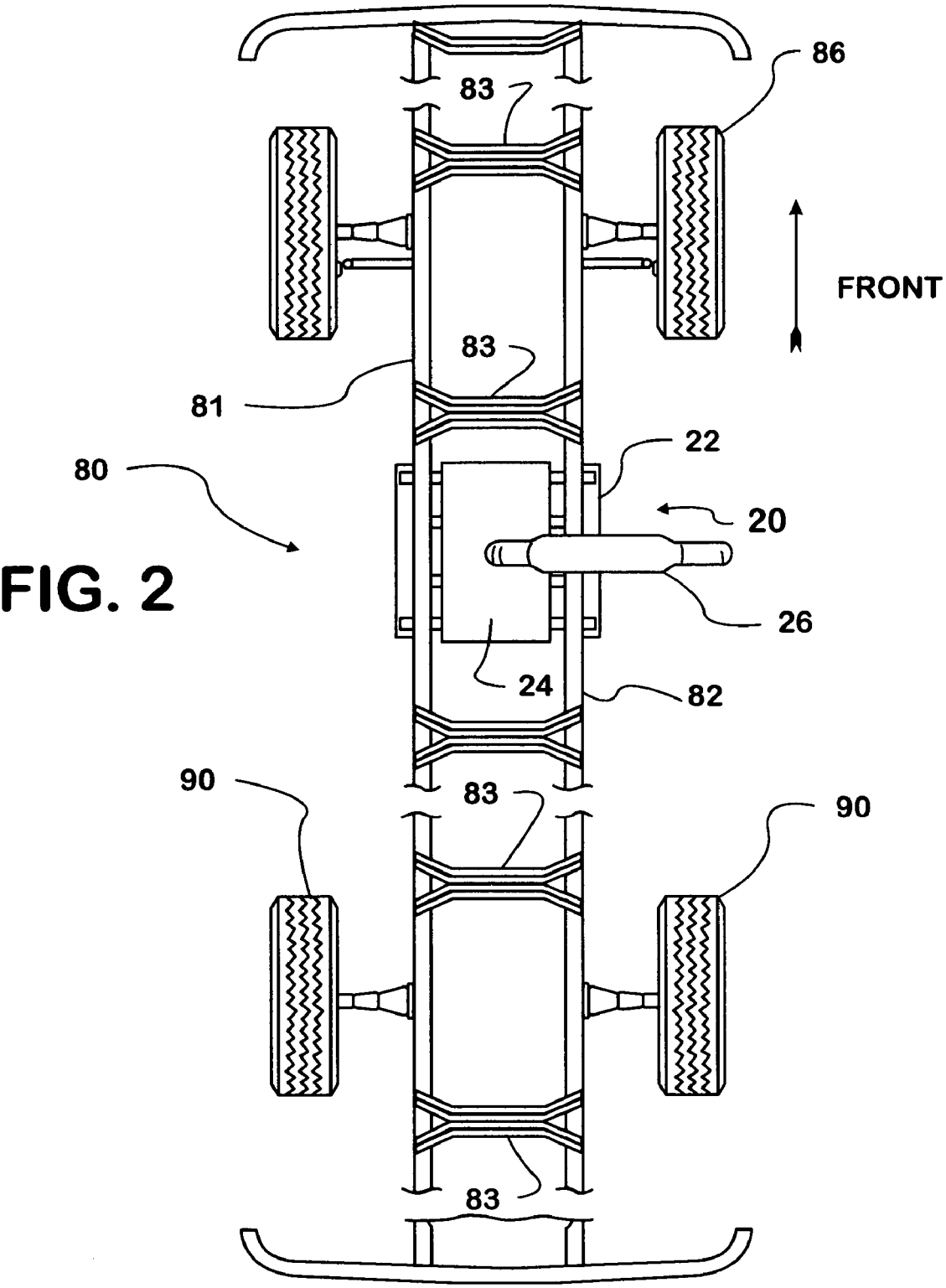
FIG. 2 is a top plan view of a bus chassis incorporating a between the rails fuel tank and its filler neck.

The location of a fuel tank system 20 is best illustrated with reference to FIG. 2 which shows fuel tank system 20 as positioned on a vehicle chassis 80. Vehicle chassis 80 is based on two longitudinally aligned, mutually parallel frame rails 81, 82. Frame rails 81, 82 are held in parallel, and chassis 80 stiffened, by a plurality of cross members 83 which are located at mutually spaced locations running from the front to the back of the vehicle. Fuel tank system 20 comprises a fuel tank 24 held in a cradle 22 which is suspended from the outside faces of frame rails 81, 82. Fuel tank 24 is located about midway between the front and the back of chassis 80 and between frame rails 81 and 82. Fuel is added to fuel tank 24 through a filler neck 26 which is disposed between the top of the fuel tank running to the side of the chassis 80 over right hand side frame rail 82.

Figure 3B:
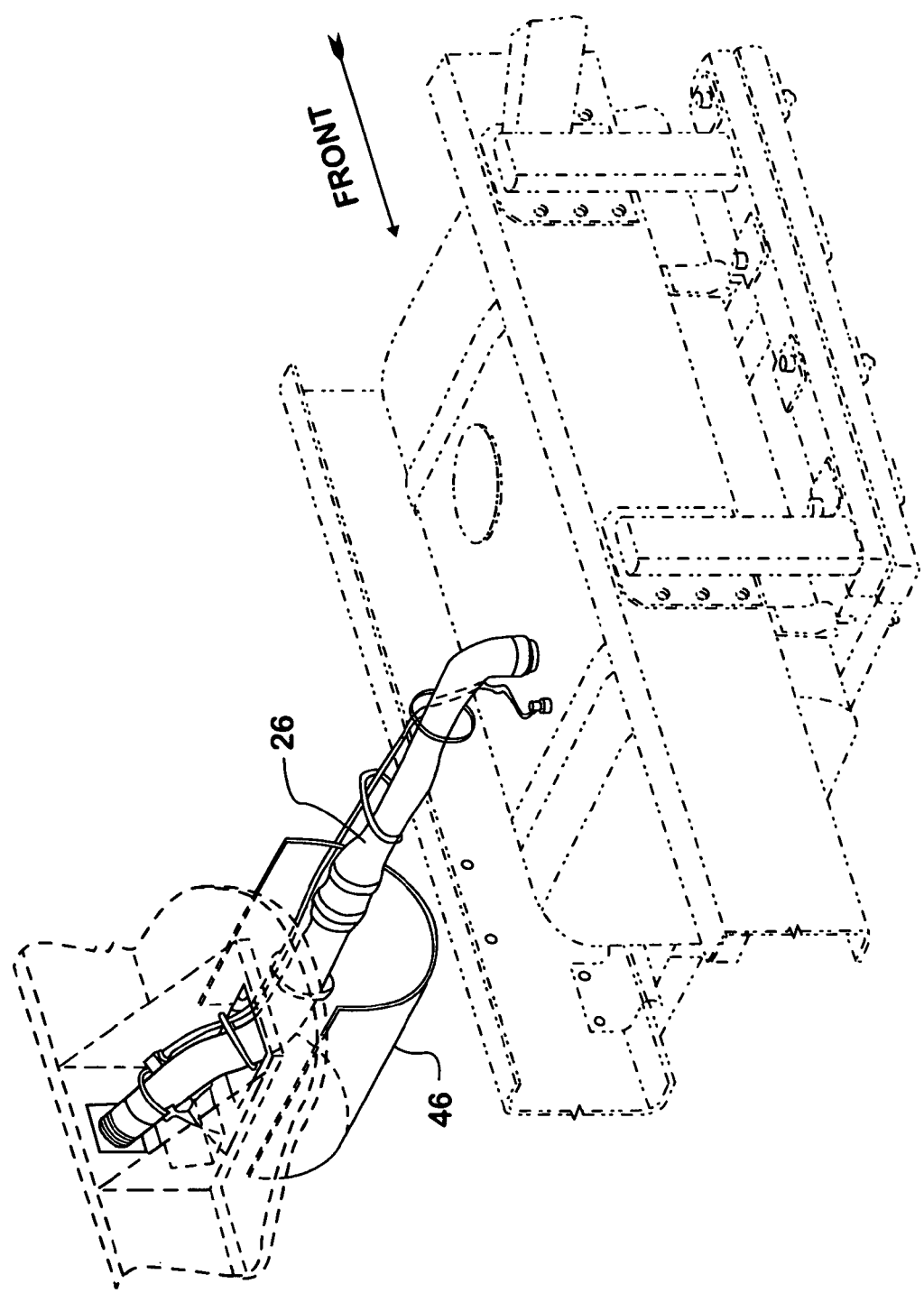

Referring now to FIGS. 3A and 3B, the manner of supporting fuel tank 24 using cradle 22 and the routing of filler neck 26 from a side of the vehicle body to the fuel tank is more completely illustrated. In FIG. 3B all features other than filler neck 26 and a protective shield 46 are shown in phantom to allow complete illustration of the filler neck. Cradle 22 comprises a plurality of slats 30 which run from side to side of the chassis 80, under frame rails 81, 82 and which support fuel tank 24 from underneath the fuel tank between the frame rails and which position the fuel tank at least partly at the level of the frame rails. The details of construction of cradle 22 are not important to understanding the invention and are in any event conventional. At least a pair of braces 34 depend from each of the outside faces of frame rails 81, 82, extending below the frame rails and carrying longitudinal supports 32 which are parallel to and below their respective frame rails. Slats 30 are connected between longitudinal supports 32. The bottom surface of fuel tank 24 may be indented to conform to the shape of slats 30. At least a pair of steal bands 36 are mounted around fuel tank 24, connecting at opposite ends to one of slats 30 using an appropriate, adjustable connector 38.

Filler neck 26 extends from an inlet 49 accessible from port 40 in body sidewall 17 to the upper exterior surface of fuel tank 24, passing over frame rail 82. Port 40 is located in sidewall 17 just above the level of floor 28. A housing 42 (with roof removed to allow viewing of the filler neck) protecting filler neck 26 is constructed around the portion of the filler neck which extends above the level of the floor. Filler neck 26 is slanted to pass though an opening 44 in floor 28 thus passing below the level the floor outside of frame rail 82. The downward slant promotes the flow of fuel toward fuel tank 24. Filler neck 26 passes between floor 28 and the upper surface of frame rail 82 between its inlet and its point of connection to full tank 24. Filler neck 26 is protected outside of frame rail 82 by a protective cover or shield is constructed of a half cylinder 46 which is placed below floor 28 under filler neck 26.

Figure 6:
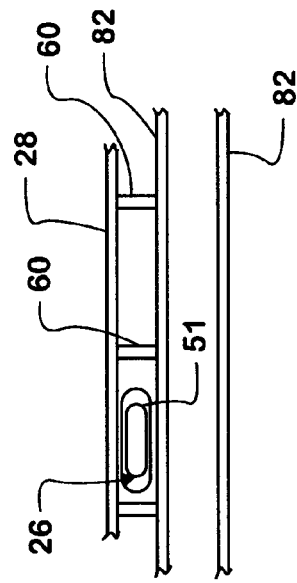
FIG. 6 is a cross sectional view taken along section line 6—6 of FIG. 4.
Figure 4:
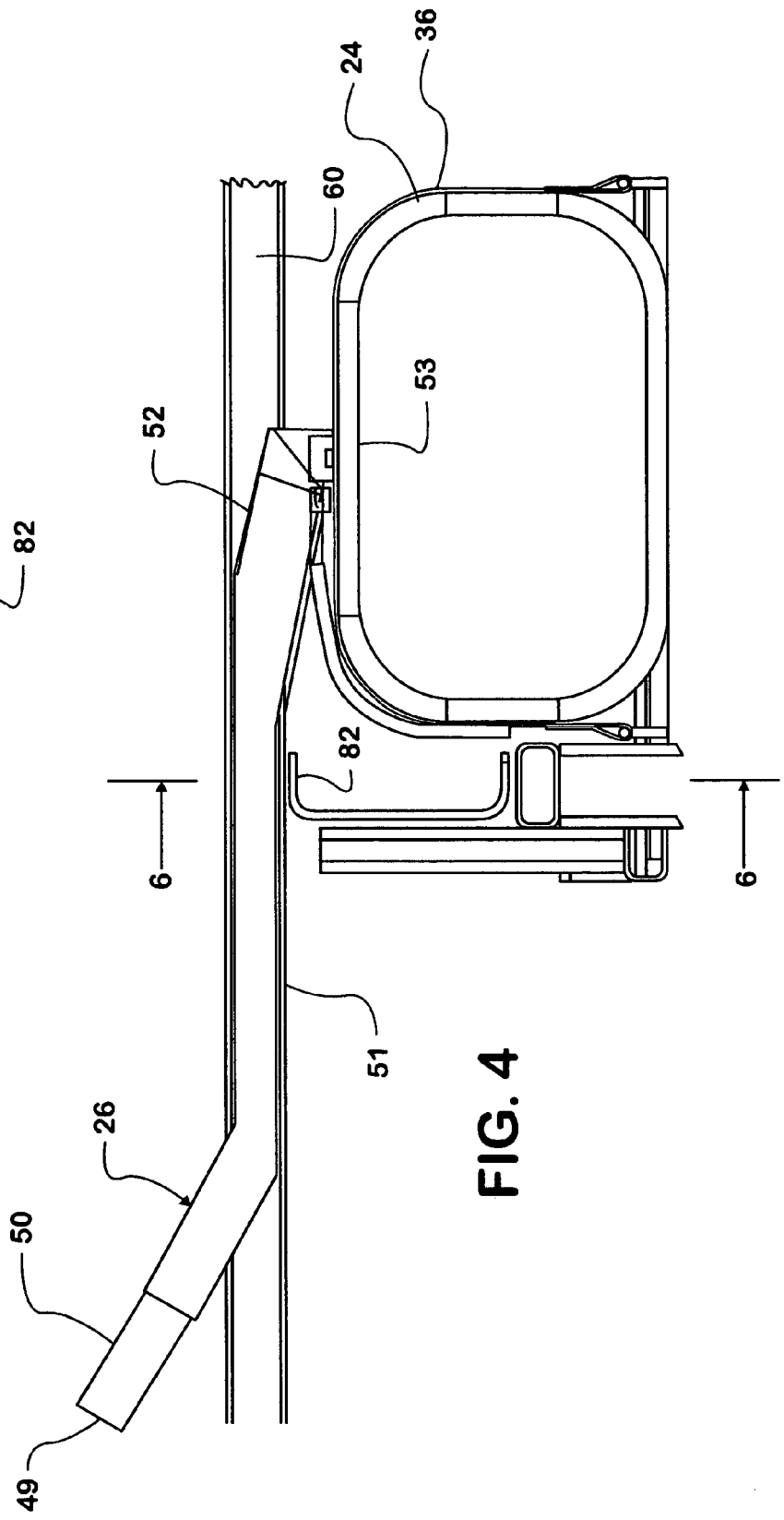
FIG. 4 is a front section of the fuel tank assembly.

Referring to FIG. 4, the changes in slope of filler neck 26 moving from inlet section 50 adjacent the outside wall of the bus toward tank 24 are better illustrated. Filler neck 26 comprises three sections of distinct shapes and sizes. The sections are an inlet section 50 closest to the side wall of the bus, which is downwardly sloped, a mid-section 51 which lies essentially horizontally and which passes over frame rail 82 but under floor 28, and an outlet section 52 which connects to fuel tank 24 through an outlet 53. Referring briefly to FIG. 6 it may be seen the mid-section 51 fits between the bottom of floor 28, the top of frame rail 82 and between a pair of cross supports 60, on which floor 28 rest and which are supported from the frame rails. Mid-section 51, unlike inlet section 50 and outlet section 52 which have circular cross sectional shapes, has an oblong cross-sectional shape, being flattened from top to bottom.

Figure 5:
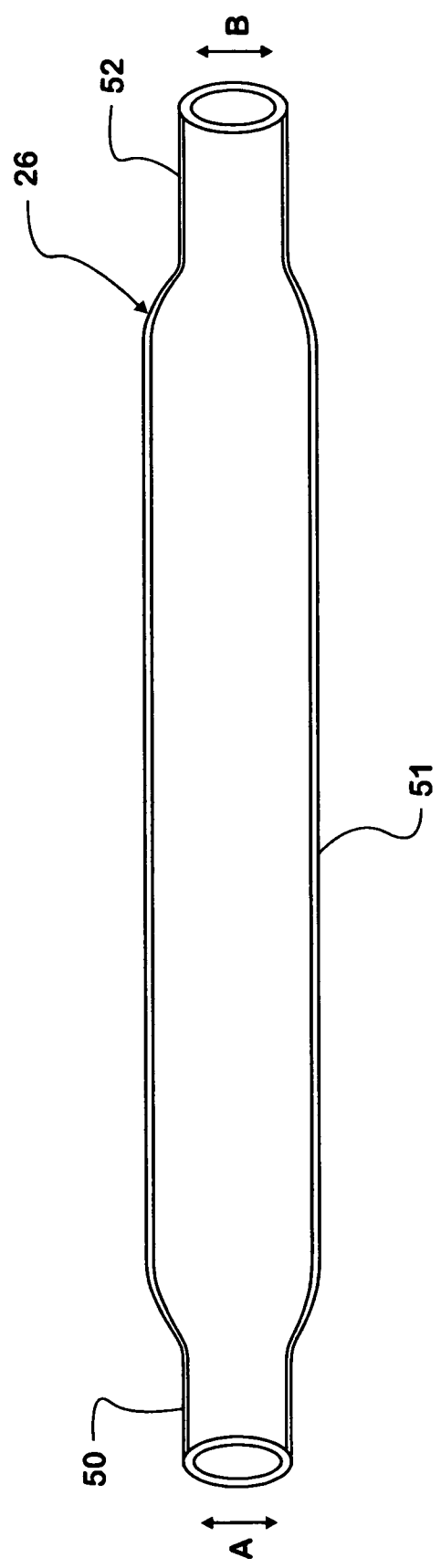
FIG. 5 is a top plan of a portion of the filler neck of the fuel tank assembly of FIG. 4.

Referring to FIG. 5, a portion of filler neck 26 is isolated to emphasize the oblong character of mid-section 51. Inlet section 50 and outlet section 52 both have circular cross-sections, however, the diameters A and B of these sections differ, with diameter B being greater than diameter A to assure that the outlet section does not become a choke point for fuel flow.

The invention provides a fuel tank filler neck for BTR fuel tanks commonly found on busses which is not unduly restrictive of fuel flow at some point along the neck. Fuel flow restriction resulting from horizontally sloped sections of the filler neck is compensated for by increasing the cross sectional area of the neck. The restricted diameter the conventionally circular pipes used between the vehicle floor and vehicle side rails has been negated by using a pipe having a section in the effected area that is other than round.

While the invention is shown in only one of its forms, it is not thus limited but is susceptible to various changes and modifications without departing from the spirit and scope of the invention.

What is claimed is:

1. A fuel tank assembly for a motor vehicle having a body, a body floor and a pair of parallel chassis frame rails supporting the body, the fuel tank assembly comprising:
   a fuel tank supported between the frame rails under the body floor; and
   a filler neck having an inlet on a side of the motor vehicle, the filler neck connecting the inlet to the fuel tank over one of the pair of parallel chassis frame rails and under the body floor adjacent the chassis frame rail, the filler neck having a circular cross sectional profile adjacent the inlet, flattening to an oblong cross sectional shape without loss of cross sectional area where the filler neck passes over one of the frame rails to fit between the frame rail and floor and resuming a circular cross sectional shape adjacent the fuel tank.

2. The fuel tank assembly as claimed in claim 1, the filler neck having a greater cross sectional area adjacent the fuel tank than adjacent the inlet.

3. A motor vehicle comprising:
   a chassis including a pair of spaced, parallel frame rails from front to rear of the vehicle;
   a vehicle body having a floor supported from the pair of spaced, parallel frame rails leaving spacing between the floor and the frame rails;
   a fuel tank positioned between the pair of spaced, parallel frame rails; and
   a filler neck having an inlet along a side of the motor vehicle, an outlet to the fuel tank and an intermediate section connecting the inlet to the outlet over one of the frame rails and below the floor, the intermediate section having a different cross sectional shape between the floor and the frame rail to fit between the frame rail and floor without loss of cross sectional area and with the cross sectional area of the filler neck increasing from the intermediate section to the outlet.

4. The motor vehicle of claim 3, the filler neck further comprising:
   a cross sectional area which increases from the inlet to the intermediate section.

5. The motor vehicle of claim 4, the filler neck further comprising:
   the portions of the filler neck adjacent the inlet and the outlet being circular.

6. The motor vehicle of claim 5, the filler neck further comprising:
   the intermediate section of filler neck being oblong.

* * * * *